US009850957B2

(12) United States Patent
Lee et al.

(10) Patent No.: US 9,850,957 B2
(45) Date of Patent: Dec. 26, 2017

(54) ELECTRONIC DEVICE WITH HAPTIC ACTUATION STICTION RELEASE AFTER NON-MOVEMENT THRESHOLD TIME PERIOD AND RELATED METHODS

(71) Applicant: Apple Inc., Cupertino, CA (US)

(72) Inventors: SungChang Lee, Cupertino, CA (US); Xuefeng Wang, Cupertino, CA (US); Mi Hye Shin, Cupertino, CA (US); Wei Guang Wu, Cupertino, CA (US); Jonah A. Harley, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 79 days.

(21) Appl. No.: 15/042,343

(22) Filed: Feb. 12, 2016

(65) Prior Publication Data

US 2017/0089396 A1 Mar. 30, 2017

Related U.S. Application Data

(60) Provisional application No. 62/234,918, filed on Sep. 30, 2015.

(51) Int. Cl.
*G08B 6/00* (2006.01)
*F16C 33/04* (2006.01)
*F16C 41/00* (2006.01)

(52) U.S. Cl.
CPC ............ *F16C 41/004* (2013.01); *F16C 33/04* (2013.01); *G08B 6/00* (2013.01)

(58) Field of Classification Search
None
See application file for complete search history.

(56) References Cited

U.S. PATENT DOCUMENTS 1,771,615 A * 7/1930 Brincil .................... F16C 33/04
264/49
4,579,380 A * 4/1986 Zaremsky .............. B25J 13/082
294/119.1
(Continued)

FOREIGN PATENT DOCUMENTS

WO 2013169299 A1 11/2013
WO 2013169303 A1 11/2013
(Continued)

OTHER PUBLICATIONS

Product Specification Sheet: GEEPLUS, VIBRO1 Vibration Actuator, 2 pages, www.geeplus.biz, downloaded on Jul. 15, 2015.
(Continued)

*Primary Examiner* — Joseph Feild
*Assistant Examiner* — John Mortell
(74) *Attorney, Agent, or Firm* — Allen, Dyer, Doppelt + Gilchrist, P.A.

(57) ABSTRACT

An electronic device may include a housing and at least one coil carried by the housing. The electronic device may include a field member that includes a magnetic body having a shaft-receiving passageway therein, and at least one bearing within the shaft-receiving passageway. A shaft extends through the at least one bearing and coupled to the housing to permit reciprocal movement of the field member along the shaft and within the housing responsive to the at least one coil. A controller may be capable of powering the at least one coil to move the field member after a threshold period of non-movement.

25 Claims, 7 Drawing Sheets

(56) References Cited

U.S. PATENT DOCUMENTS

| | | | |
|---|---|---|---|
| 4,897,582 | A | 1/1990 | Otten et al. |
| 6,429,849 | B1 * | 8/2002 | An .................... G05G 9/047 |
| | | | 345/161 |
| 7,768,160 | B1 | 8/2010 | Sahyoun |
| 8,018,105 | B2 | 9/2011 | Erixon et al. |
| 8,031,181 | B2 | 10/2011 | Rosenberg et al. |
| 8,169,402 | B2 | 5/2012 | Shahoian et al. |
| 9,443,410 | B1 * | 9/2016 | Constien ............ G08B 21/0453 |
| 2014/0197936 | A1 | 7/2014 | Biggs et al. |
| 2015/0109223 | A1 | 4/2015 | Kessler et al. |
| 2015/0116205 | A1 | 4/2015 | Westerman et al. |
| 2015/0130730 | A1 | 5/2015 | Harley et al. |
| 2017/0083093 | A1 * | 3/2017 | Hajati .................... G06F 3/016 |
| 2017/0085402 | A1 * | 3/2017 | Hajati ................. H04L 25/4902 |

FOREIGN PATENT DOCUMENTS

| | | | |
|---|---|---|---|
| WO | 2013169305 | A1 | 11/2013 |
| WO | 2013170099 | A1 | 11/2013 |
| WO | 2013188307 | A2 | 12/2013 |
| WO | 2014018111 | A1 | 1/2014 |
| WO | 2015020663 | A1 | 2/2015 |

OTHER PUBLICATIONS

Product Specification Sheet: AMES, Self-lubricating Bearings, 2 Pages, http://www.ames-sintering.com/products/self-lubricating-bearings/, downloaded on Feb. 12, 2016.

* cited by examiner

ELECTRONIC DEVICE WITH HAPTIC ACTUATION STICTION RELEASE AFTER NON-MOVEMENT THRESHOLD TIME PERIOD AND RELATED METHODS

TECHNICAL FIELD

The present disclosure relates to the field of electronics, and, more particularly, to the field of haptics.

BACKGROUND

Haptic technology is becoming a more popular way of conveying information to a user. Haptic technology, which may simply be referred to as haptics, is a tactile feedback based technology that stimulates a user's sense of touch by imparting relative amounts of force to the user.

A haptic device or haptic actuator is an example of a device that provides the tactile feedback to the user. In particular, the haptic device or actuator may apply relative amounts of force to a user through actuation of a mass that is part of the haptic device. Through various forms of tactile feedback, for example, generated relatively long and short bursts of force or vibrations, information may be conveyed to the user.

SUMMARY

An electronic device may include a housing and at least one coil carried by the housing. The electronic device may include a field member comprising a magnetic body having a shaft-receiving passageway therein, and at least one bearing within the shaft-receiving passageway. A shaft extends through the at least one bearing and coupled to the housing to permit reciprocal movement of the field member along the shaft and within the housing responsive to the at least one coil. A controller may be capable of powering the at least one coil to move the field member after a threshold period of non-movement.

The at least one bearing may include a self-lubricating bearing, for example. The at least one self-lubricating bearing may include a porous bearing body, and a lubricant carried within the porous bearing body, for example. The at least one bearing may include a pair of self-lubricating bearings at opposite ends of the shaft-receiving passageway.

The shaft may include a self-lubricating shaft, for example. The self-lubricating shaft may include a porous shaft body, and a lubricant carried within the porous shaft body.

The controller may be capable of determining at least one user indication, and powering the at least one coil to also move the field member based upon the at least one user indication. The controller may be capable of powering the at least one coil to move the field member at slow and fast speeds. The controller may be capable of powering the at least one coil to move the field member after the threshold period of non-movement at the slow speed, for example. The fast speed may correspond to a resonant frequency of the electronic device, for example.

The controller may be capable of powering the at least one coil to move the field member for a threshold time period of movement after the threshold period of non-movement. The electronic device may also include at least one biasing member between the housing and the field member, for example. The electronic device may further include at least one mechanical stop between the housing and the field member.

A method aspect is directed to a method of lubricating a shaft of an electronic device that includes a housing, at least one coil carried by the housing, a field member comprising a magnetic body having a shaft-receiving passageway therein, at least one bearing within the shaft-receiving passageway, and with the shaft extending through the at least one bearing and coupled to the housing to permit reciprocal movement of the field member along the shaft and within the housing responsive to the at least one coil. The method includes using a controller to power the at least one coil to move the field member after a threshold period of non-movement to lubricate the shaft.

A device aspect is directed to an electronic device that may include a housing, at least one permanent magnet carried by the housing, and a field member that includes at least one coil and having a shaft-receiving passageway therein. The electronic device may also include at least one bearing within the shaft-receiving passageway and a shaft extending through the at least one bearing and coupled to the housing to permit reciprocal movement of the field member along the shaft and within the housing responsive to the at least one coil. A controller may be capable of powering the at least one coil to move the field member after a threshold period of non-movement.

The at least one bearing may include a self-lubricating bearing, for example. The at least one self-lubricating bearing may include a porous bearing body, and a lubricant carried within the porous bearing body, for example. The at least one bearing may include a pair of self-lubricating bearings at opposite ends of the shaft-receiving passageway.

The shaft may include a self-lubricating shaft, for example. The self-lubricating shaft may include a porous shaft body, and a lubricant carried within the porous shaft body.

The controller may be capable of determining at least one user indication, and powering the at least one coil to also move the field member based upon the at least one user indication. The controller may be capable of powering the at least one coil to move the field member at slow and fast speeds. The controller may be capable of powering the at least one coil to move the field member after the threshold period of non-movement at the slow speed, for example. The fast speed may correspond to a resonant frequency of the electronic device, for example.

The controller may be capable of powering the at least one coil to move the field member for a threshold time period of movement after the threshold period of non-movement. The electronic device may also include at least one biasing member between the housing and the field member, for example. The electronic device may further include at least one mechanical stop between the housing and the field member.

A method aspect is directed to a method of lubricating a shaft of an electronic device that includes a housing, at least one permanent magnet carried by the housing, a field member comprising at least one coil and having a shaft-receiving passageway therein, at least one bearing within the shaft-receiving passageway, and with the shaft extending through the at least one bearing and coupled to the housing to permit reciprocal movement of the field member along the shaft and within the housing responsive to the at least one coil. The method may include using a controller to power the least one coil to move the field member after a threshold period of non-movement to lubricate the shaft.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout and prime notation is used to describe like elements in different embodiments.

Figure 1:
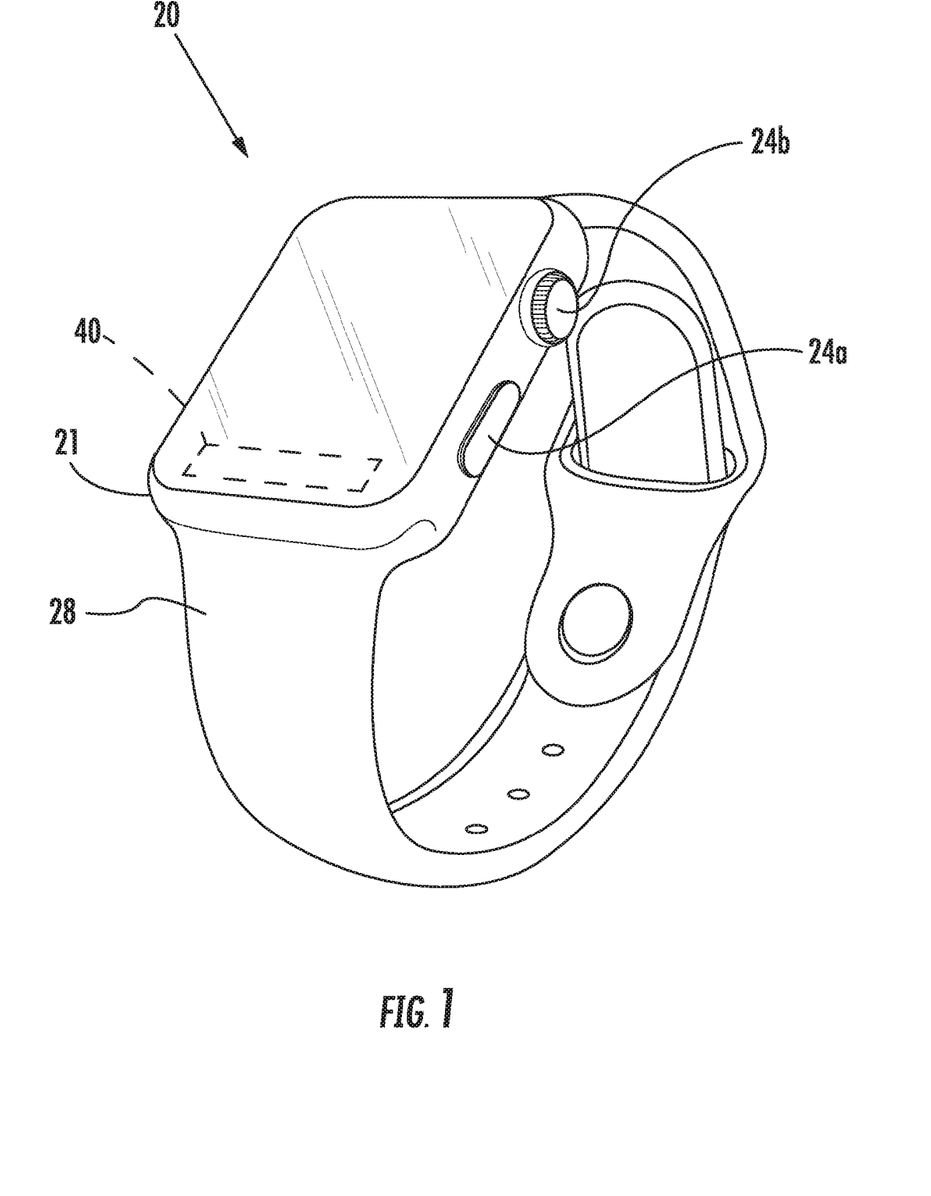
FIG. 1 is a perspective view of an electronic device according to an embodiment.
Figure 2:
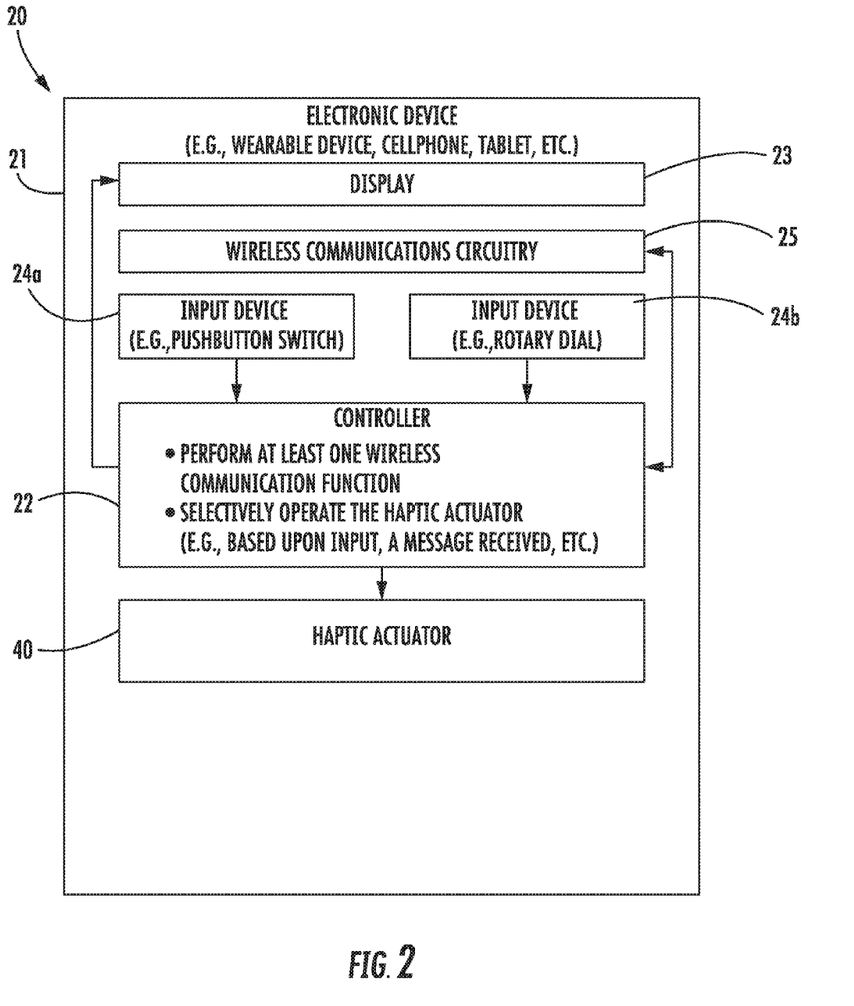
FIG. 2 is a schematic block diagram of the electronic device of FIG. 1.

Referring initially to FIGS. 1 and 2, an electronic device 20 illustratively includes a device housing 21 and a controller 22 carried by the device housing. The electronic device 20 is illustratively a mobile wireless communications device, for example, a wearable wireless communications device, and includes a band 28 or strap for securing it to a user. The electronic device 20 may be another type of electronic device, for example, a cellular telephone, a tablet computer, a laptop computer, etc.

Wireless communications circuitry 25 (e.g. cellular, WLAN Bluetooth, etc.) is also carried within the device housing 21 and coupled to the controller 22. The wireless communications circuitry 25 cooperates with the controller 22 to perform at least one wireless communications function, for example, for voice and/or data. In some embodiments, the electronic device 20 may not include wireless communications circuitry 25.

A display 23 is also carried by the device housing 21 and is coupled to the controller 22. The display 23 may be a liquid crystal display (LCD), for example, or may be another type of display, as will be appreciated by those skilled in the art.

Finger-operated user input devices 24a, 24b, illustratively in the form of a pushbutton switch and a rotary dial are also carried by the device housing 21 and is coupled to the controller 22. The pushbutton switch 24a and the rotary dial 24b cooperate with the controller 22 to perform a device function in response to operation thereof. For example, a device function may include a powering on or off of the electronic device 20, initiating communication via the wireless communications circuitry 25, and/or performing a menu function.

Figure 3:
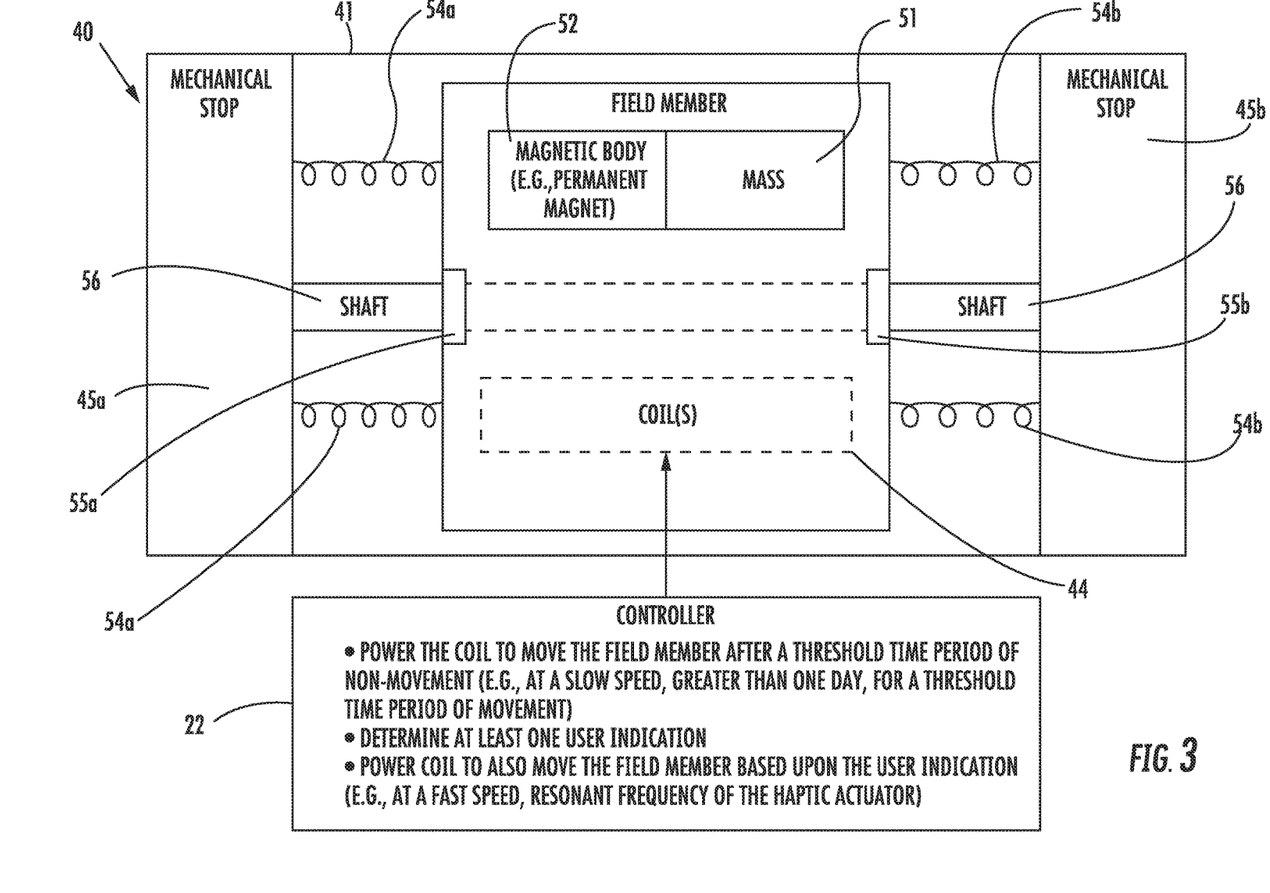
FIG. 3 is a schematic diagram of the haptic actuator of FIG. 2.
Figure 4:
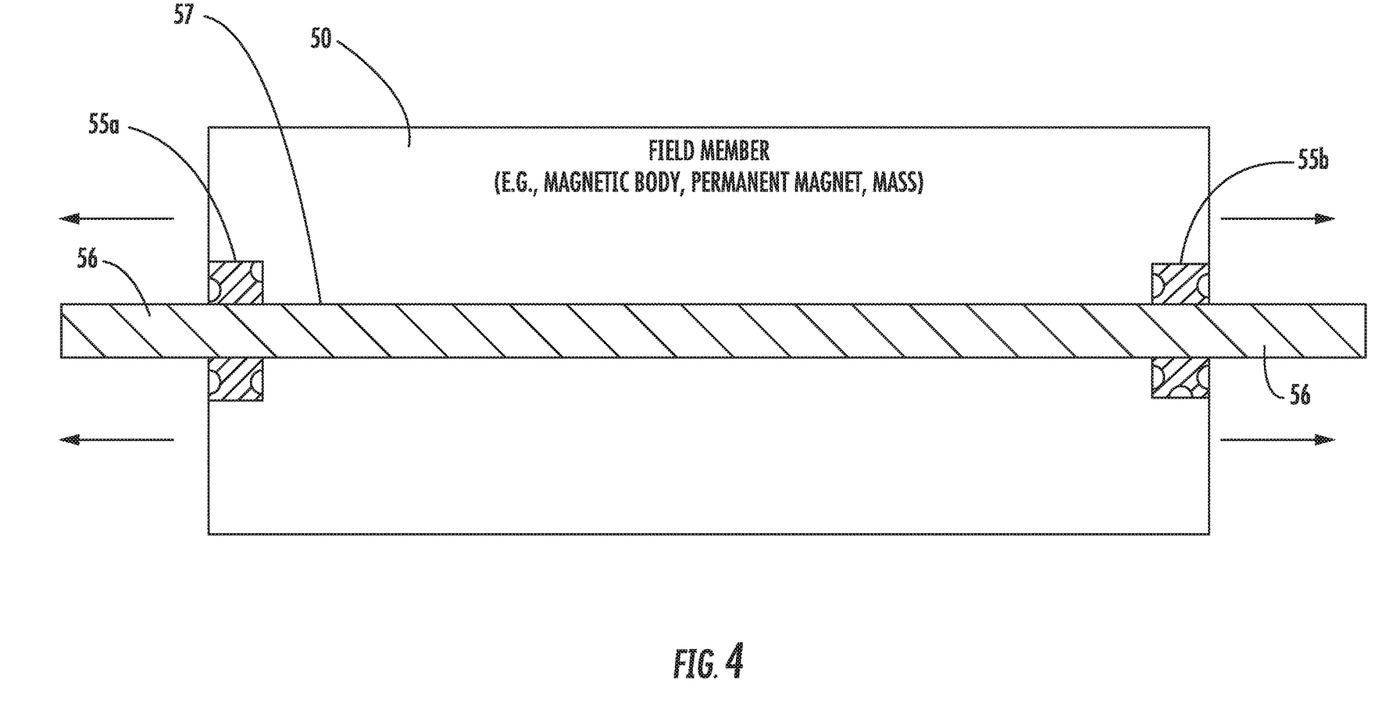
FIG. 4 is a partial schematic cross-sectional view a portion of the haptic actuator of FIG. 3

Referring now additionally to FIGS. 3 and 4, the electronic device 20 illustratively includes a haptic actuator 40. The haptic actuator 40 is coupled to the controller 22 and determines user indications and operates the haptic actuator by way of applying power or a voltage to a coil 44 to move a field member 50 based upon the user indication. More particularly, the haptic actuator 40 cooperates with the controller 22 to provide haptic feedback to the user in the form of relatively long and short vibrations or "taps", particularly when the user is wearing the electronic device 20. The vibrations may be indicative of a message received, and the duration of the vibration may be indicative of the type of message received. Of course, the vibrations may be indicative of or convey other types of information.

While a controller 22 is described, it should be understood that the controller 22 may include one or more of a processor and other circuitry to perform the functions described herein, and some or all of the circuitry may be carried by actuator housing and/or by the device housing 21.

Further details of the haptic actuator 40 are now described. The haptic actuator 40 includes an actuator housing 41. The coil 44 is carried by the actuator housing 41. Of course, there may be more than one coil carried by the housing 41.

The field member 50 is movable within the housing 41 responsive to the coil 44. The movement of the field member 50 creates the haptic feedback, or tapping, as will be appreciated by those skilled in the art. While the movement of the field member 50 may be described as being moveable in one direction, i.e., a linear haptic actuator, it should be understood that in some embodiments, the field member may be movable in other directions, i.e., an angular haptic actuator, or may be a combination of both a linear and an angular haptic actuator.

The field member 50 may include one or more masses 51 and may be shaped for a particular application or operation. The field member 50 may also include one or more permanent magnets 52, i.e. magnetic bodies, cooperating with the coil 44 to provide movement of the field member. The field member 50 has a shaft receiving passageway 57 therein.

The haptic actuator 40 also includes biasing members 54a, 54b between the actuator housing 41 and the field member 50. The biasing members 54a, 54b are illustratively in the form of springs for maintaining the field member suspended in the housing 41. The springs 54a, 54b may be mechanical springs, such as, for example, coil springs, leaf springs, and flexures. The springs 54a, 54b may also or additionally be magnetic springs that, through interaction with the permanent magnets and/or ferritic parts of the actuator housing 41, if any, store and amplify the energy in the form of elastic/magnetic energy.

Figure 5:
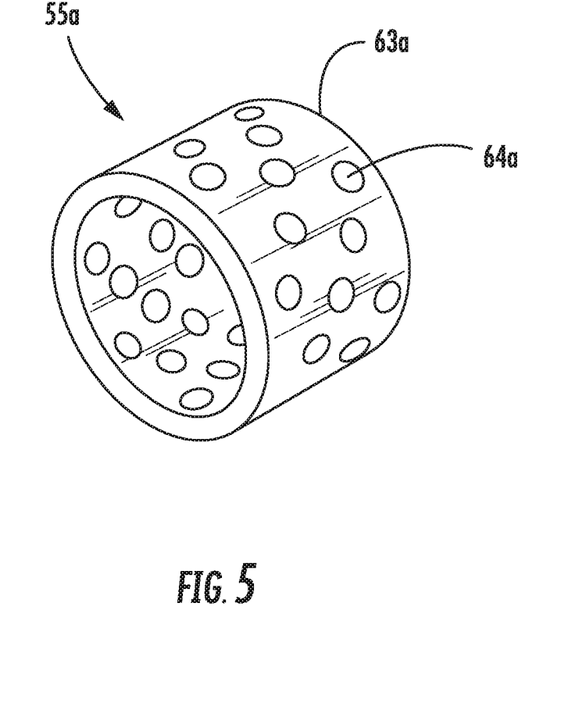
FIG. 5 is a perspective view of a self-lubricating bearing of the haptic actuator of FIG. 4.

Additionally, the haptic actuator 40 includes a pair bearings within the shaft receiving passageway 57, which are illustratively in the form of self-lubricating bearings 55a, 55b. Of course, in some embodiments, the bearings 55a, 55b may not be self-lubricating. Referring additionally to FIG. 5, each self-lubricating bearing 55a, 55b includes a porous bearing body 63a, and a lubricant 64a carried within the porous bearing body.

A shaft 56 extends through the self-lubricating bearings 55a, 55b and is coupled to the actuator housing 41 to permit reciprocal movement of the field member 50 along the shaft and within the housing responsive to the coil 44. Other and/or additional components, such as shafts, linear/angular bearings, sliding bearings, flexures, multi-bar linkage mechanisms, and springs, may enable motion of the field member 50 in the desired direction (e.g. X axis in a linear actuator or around a certain axis in an angular actuator) while constraining motion in other degrees of freedom.

The haptic actuator 40 also includes mechanical limit stops 45a, 45b between the housing 41 and the field member 50. The mechanical limit stops 45a, 45b limit the movement of the field member to a desired range and/or stop the field member from crashing or banging into the housing 41.

While mechanical stops 45a, 45b are described, it will be appreciated that the mechanical stops may be part of or a portion of the housing 41.

Typically, circuitry generates a sinusoidal drive waveform that drives the field member to move from an initial at-rest position. However, as will be appreciated by those skilled in the art, in a stationary or at-rest position, the field member 50 has a static friction associated with it which may cause the field member to "get stuck" despite the application of a drive voltage. A certain amount of force or voltage is thus needed to overcome this static friction force to cause the field member 50 to move. One approach to drive the field member 50 from the at-rest position is to increase the drive voltage or amplitude of the sinusoidal drive waveform. However, once the static friction force is overcome, the field member 50 typically rapidly accelerates and crashes or bangs into the mechanical limit stops 45a, 45b.

In some applications it may be particularly desirable to not have the field member 50 hit or bang into the mechanical limit stops 45a, 45b as this may generate a corresponding "banging" noise. To reduce the amount of noise, for example, caused by the increased amplitude, the controller 22 powers the coil 44 to move the field member 50 after a threshold time period of non-movement.

More particularly, the controller 22 may power the coil 44 to move the field member 50 at slow and fast speeds. The fast speed, which may correspond to a resonant frequency of the haptic actuator 40, is the speed at which the haptic actuator operates during normal operations, for example, providing user indications. The controller 22 powers the coil 44 to move the field member 50 after the threshold period of non-movement at the slow speed and for a threshold time period of movement. In other words, after a period of time where the haptic actuator is not moved, such as, for example, more than a day, the controller 22 may operate the field member 50 at slow speeds, for example, for a short duration of time (e.g., a few sweeps of the field member), to maintain or increase lubrication distribution of the shaft 56. The interface between the shaft 56 and each the self-lubricating bearings 55a, 55b is lubricated. Of course, the time period for non-movement and/or the duration of movement may be other time periods. The slow speed may reduce any noise that may be caused by the movement of the field member 50 or by the field member hitting the mechanical limit stops 45a, 45b.

As will be appreciated by those skilled in the art, the controller 22 moving the field member 50 after a threshold period of non-movement may be particularly advantageous in circumstances where the field member may experience "high stiction," for example, during shipment, storage, battery charging (as determined by the controller 22, for example), and/or extended time periods of non-movement or use. High stiction, which may be caused by non-uniform lubrication, may lead to overall failure of the haptic actuator (i.e., seizure). By moving the field member 50 after a threshold time of non-movement, lubrication may be more uniformly distributed, which may reduce "high stiction."

A method aspect is directed to a method of lubricating the shaft 56 of the electronic device 20. The method includes using the controller 22 to power the coil 44 to move the field member 50 after a threshold period of non-movement to lubricate the shaft.

Figure 6:
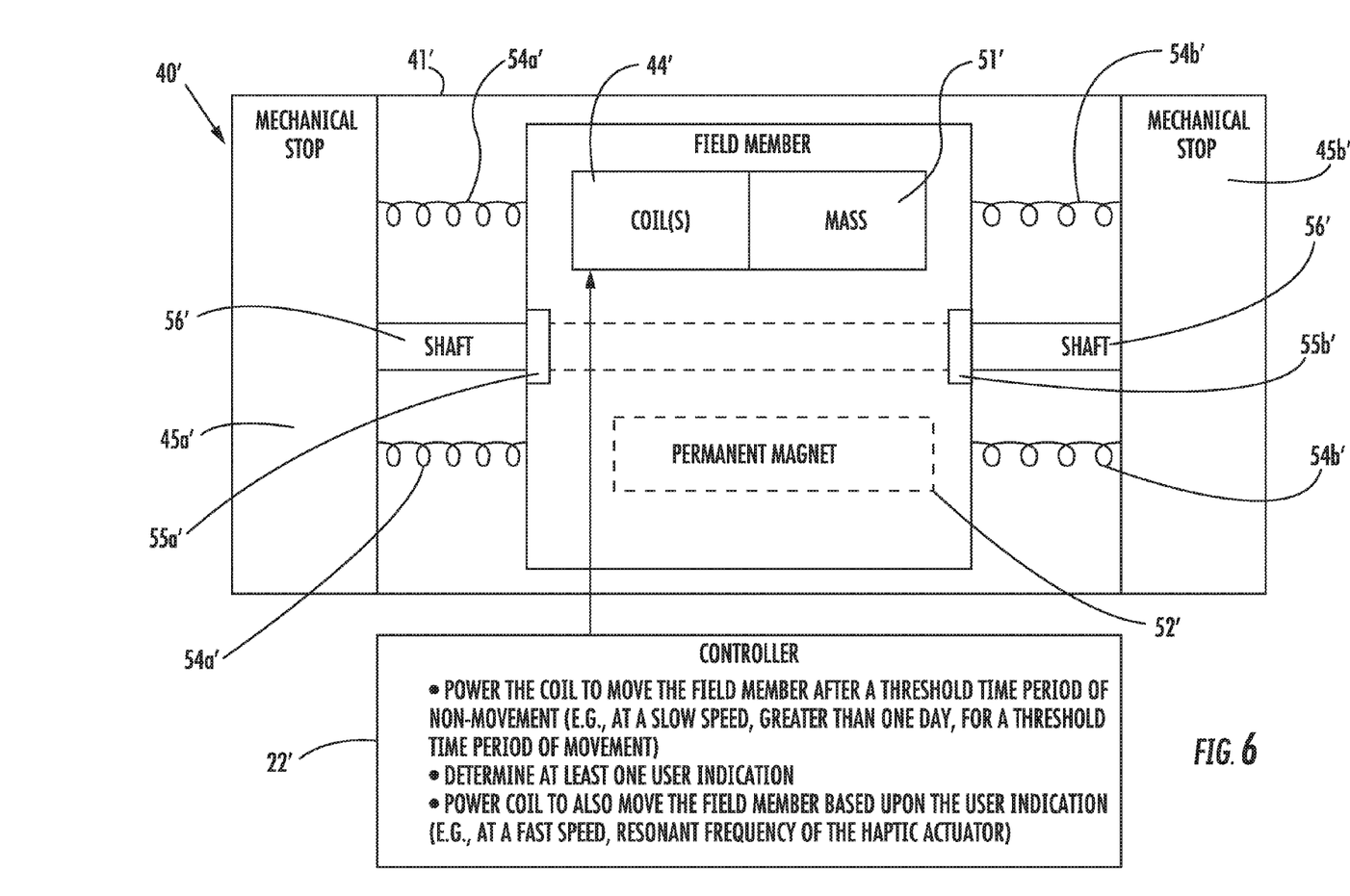
FIG. 6 is a schematic diagram of an electronic device in accordance with another embodiment.

Referring now to FIG. 6, in another embodiment, the haptic actuator 40' may include a permanent magnet 52' carried by the actuator housing 41', and the field member 50' may include one or more coils 44' that cooperate with the permanent magnet. In other words, in contrast to the embodiment described above, the permanent magnet is stationary (i.e., carried by the actuator housing 41') and the coils 44', as part of the field member 50' are moving (i.e., connected to the mass). Of course, there may be any number of coils and/or permanent magnets. A related method aspect is directed to lubricating the shaft 56' of the electronic device 20' that includes the one or more coils 44' as part of the field member 50'.

Figure 7:
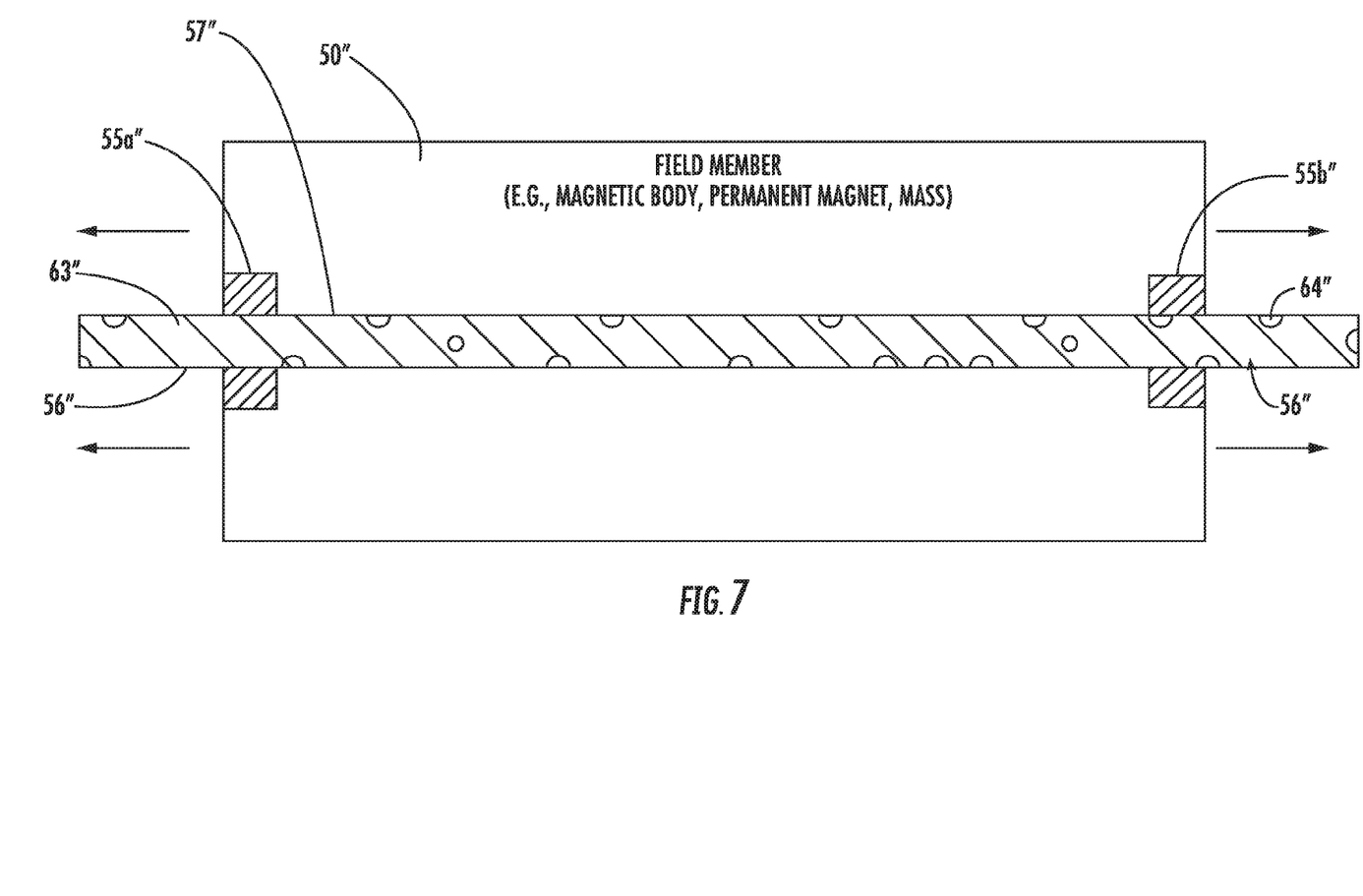
FIG. 7 is a schematic diagram of an electronic device in accordance with another embodiment.

Referring now to FIG. 7, in another embodiment, the haptic actuator 40" may include a self-lubricating shaft 56". The self-lubricating shaft 56" may include a porous shaft body 63" and a lubricant 64" carried within the porous shaft body. The movement of the field member 50" by the controller 22" after a threshold period of non-movement may reduce stiction in the same way as if there were self-lubricating bearings, that is, by applying or distributing lubricant during movement, for example, uniformly and to the interface between the bearings 55a", 55b" and the shaft 56". A related method aspect is directed to lubricating the bearings 55a", 55b of the electronic device 20" by using the controller 22" to move the field member 50" in an electronic device 20" that includes a self-lubricating shaft 56".

It will be appreciated that while multiple embodiments have been described herein, elements from each of the embodiments may be used in combination with one another. For example, in some embodiments, the electronic device may include both a self-lubricating shaft 56" and self-lubricating 55a, 55b bearings. Alternatively, neither the shaft 56 nor the bearings 55a", 55b" may be self-lubricating.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed:

1. An electronic device comprising:
   a housing;
   at least one coil carried by the housing;
   a field member comprising a magnetic body having a shaft-receiving passageway therein;
   at least one bearing within the shaft-receiving passageway;
   a shaft extending through the at least one bearing and coupled to the housing to permit reciprocal movement of the field member along the shaft and within the housing responsive to the at least one coil; and
   a controller capable of powering the at least one coil to move the field member after a threshold period of non-movement.

2. The electronic device of claim 1 wherein the at least one bearing comprises a self-lubricating bearing.

3. The electronic device of claim 2 wherein the at least one self-lubricating bearing comprises a porous bearing body, and a lubricant carried within the porous bearing body.

4. The electronic device of claim 1 wherein the at least one bearing comprises a pair of self-lubricating bearings at opposite ends of the shaft-receiving passageway.

5. The electronic device of claim 1 wherein the shaft comprises a self-lubricating shaft.

6. The electronic device of claim 5 wherein the self-lubricating shaft comprises a porous shaft body, and a lubricant carried within the porous shaft body.

7. The electronic device of claim 1 wherein the controller is capable of determining at least one user indication, and powering the at least one coil to also move the field member based upon the at least one user indication.

8. The electronic device of claim 1 wherein the controller is capable of powering the at least one coil to move the field member at slow and fast speeds; and
wherein the controller is capable of powering the at least one coil to move the field member after the threshold period of non-movement at the slow speed.

9. The electronic device of claim 8 wherein the fast speed corresponds to a resonant frequency of the electronic device.

10. The electronic device of claim 1 wherein the controller is capable of powering the at least one coil to move the field member for a threshold time period of movement after the threshold period of non-movement.

11. The electronic device of claim 1 further comprising at least one biasing member between the housing and the field member.

12. The electronic device of claim 1 further comprising at least one mechanical stop between the housing and the field member.

13. An electronic device comprising:
a housing;
at least one coil carried by the housing;
a field member comprising a magnetic body having a shaft-receiving passageway therein;
at least one self-lubricating bearing within the shaft-receiving passageway;
a shaft extending through the at least one self-lubricating bearing and coupled to the housing to permit reciprocal movement of the field member along the shaft and within the housing responsive to the at least one coil; and
a controller capable of powering the at least one coil to move the field member at slow and fast speeds, and, after a threshold period of non-movement, move the field member at the slow speed.

14. The electronic device of claim 13 wherein the at least one self-lubricating bearing comprises a porous bearing body, and a lubricant carried within the porous bearing body.

15. The electronic device of claim 13 wherein the at least one bearing comprises a pair of self-lubricating bearings at opposite ends of the shaft-receiving passageway.

16. The electronic device of claim 13 wherein the shaft comprises a self-lubricating shaft.

17. The electronic device of claim 16 wherein the self-lubricating shaft comprises a porous shaft body, and a lubricant carried within the porous shaft body.

18. The electronic device of claim 13 wherein the controller is capable of determining at least one user indication, and powering the at least one coil to also move the field member based upon the at least one user indication.

19. A method of lubricating a shaft of an electronic device comprising a housing, at least one coil carried by the housing, a field member comprising a magnetic body having a shaft-receiving passageway therein, at least one bearing within the shaft-receiving passageway, and with the shaft extending through the at least one bearing and coupled to the housing to permit reciprocal movement of the field member along the shaft and within the housing responsive to the at least one coil, the method comprising:
using a controller to power the at least one coil to move the field member after a threshold period of non-movement to lubricate the shaft.

20. The method of claim 19 wherein the at least one bearing comprises a self-lubricating bearing.

21. The method of claim 20 wherein the at least one self-lubricating bearing comprises a porous bearing body, and a lubricant carried within the porous bearing body.

22. The method of claim 19 wherein the at least one bearing comprises a pair of self-lubricating bearings at opposite ends of the shaft-receiving passageway.

23. The method of claim 19 wherein the shaft comprises a self-lubricating shaft.

24. The method of claim 19 further comprising using the controller to determine at least one user indication, and power the at least one coil to also move the field member based upon the at least one user indication.

25. The method of claim 19 wherein the controller is capable of powering the at least one coil to move the field member at slow and fast speeds; and wherein using the controller comprises using the controller to power the at least one coil to move the field member after the threshold period of non-movement at the slow speed.

* * * * *